United States Patent [19]

Klassen

[11] Patent Number: 5,328,228
[45] Date of Patent: Jul. 12, 1994

[54] COVER FOR TRUCK BED AND CARGO

[76] Inventor: Michael J. Klassen, 2092 S. 2900 W., Aberdeen, Id. 83210

[21] Appl. No.: 44,218

[22] Filed: Apr. 6, 1993

[51] Int. Cl.⁵ .............................................. B60J 11/00
[52] U.S. Cl. ...................................... 296/98; 296/100
[58] Field of Search ................. 296/98, 100, 105, 111

[56] References Cited

U.S. PATENT DOCUMENTS

| | | | |
|---|---|---|---|
| 4,023,857 | 5/1977 | Killion | 296/98 |
| 4,030,780 | 6/1977 | Petretti | 296/100 |
| 4,050,734 | 9/1977 | Richard | 296/98 |
| 4,225,175 | 9/1980 | Fredin | 296/98 |
| 4,281,872 | 8/1981 | Biancale | 296/100 |
| 4,518,193 | 5/1985 | Heider et al. | 296/98 |
| 4,529,098 | 7/1985 | Heider et al. | 220/211 |
| 4,673,208 | 6/1987 | Tsukamoto | 296/98 |
| 4,834,445 | 5/1989 | Odegaard | 296/98 |

Primary Examiner—Joseph D. Pape
Attorney, Agent, or Firm—Frank J. Dykas; Craig M. Korfanta

[57] ABSTRACT

Embodiments of a cover for a truck bed are shown and described. A lever assembly rotates bi-directionally and parallel to a side of the truck bed to swing a roller above the truck bed. A tarp is attached to the truck bed and to the roller and is extended and retracted from over the truck bed when the lever assembly swings. A coiled spring inside the roller biases the roller to an extent that keeps the tarp taut when it is extended, rolls up the tarp as it is being retracted, and keeps the tarp tightly rolled after it is retracted to the one side of the truck. The lever assembly includes an arcuate member and a substantially coplanar arm. The lever assembly is bi-directionally rotated by a system in which a flexible connector has two sections that are attached to the arcuate member, extend in opposite directions around the arcuate member, and are pulled by a drive mechanism.

5 Claims, 7 Drawing Sheets

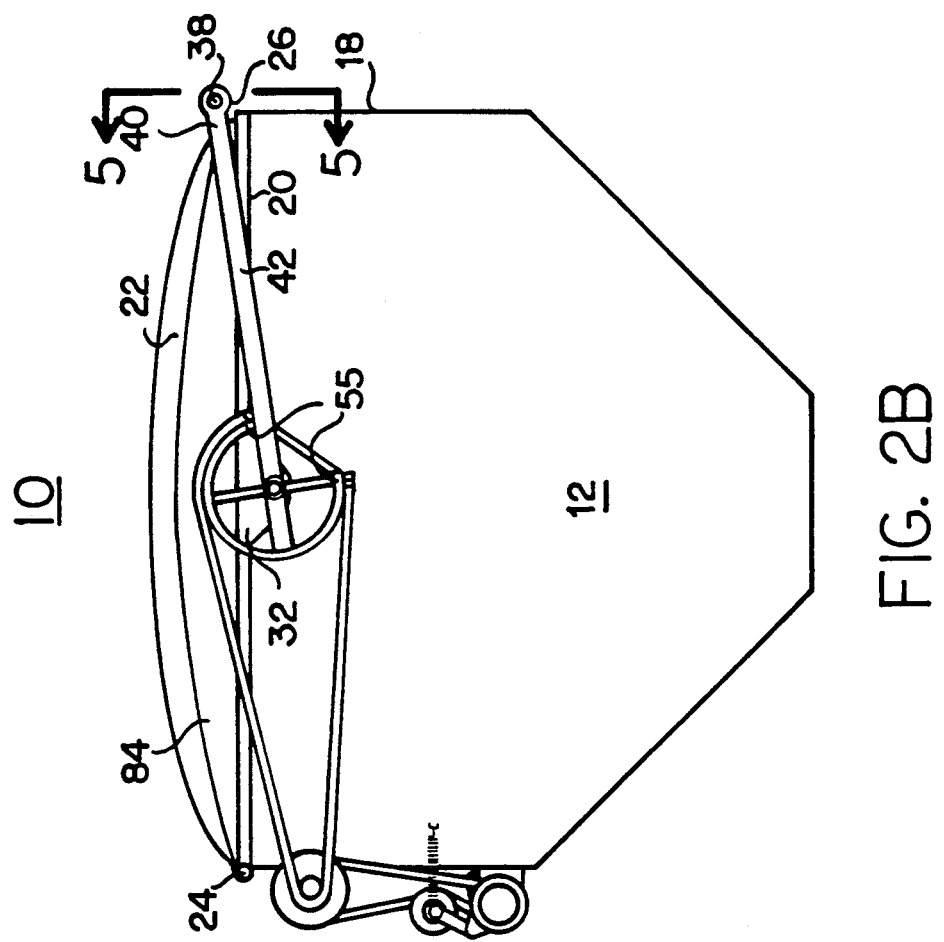

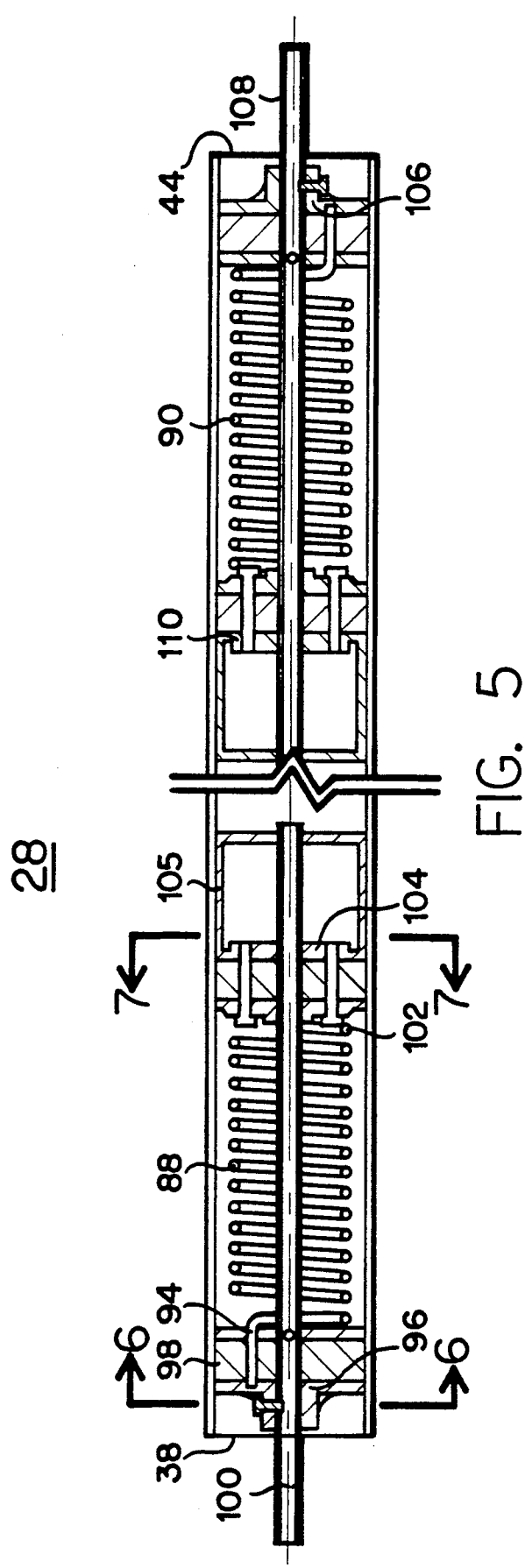
FIG. 5
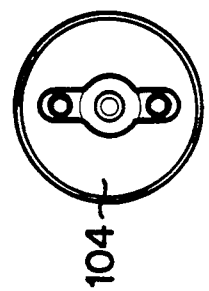
FIG. 6
FIG. 7

5,328,228

COVER FOR TRUCK BED AND CARGO

BACKGROUND OF THE INVENTION

1. Technical Field

This invention relates generally to covers for truck beds for protecting the cargo and preventing loose cargo from being blown out during transport. More specifically, this invention relates to flexible tarp covers that can be unrolled to cover the truck bed and rerolled to one side for storage.

2. Background Art

Truck bed covers are especially useful, and are sometimes required, for transport of farm produce and bulk materials that tend to blow out of the bed when the truck is at highway speeds.

Some designs feature a flexible cover that is drawn or unrolled along a track. Heider et al. (U.S. Pat. Nos. 4,529,098 and 4,518,193) places a track means along the upper edge of a box end wall, and uses a motor to rotate a shaft back and forth along the track to wind and unwind a sheet member. Killion (U.S. Pat. No. 4,023,857) moves a winding member back and forth across the truck bed on support arms moving on a generally horizontal track. Biancale (U.S. Pat. No. 4,281,872) discloses an accordion-folded tarpaulin that is drawn in window-drape fashion across a truck bed on support rods by a cable system.

Some designs use a pivot arm to move a flexible cover. Fredin (U.S. Pat. No. 4,225,175) uses a piston to pivot two arms that carry a shaft and a tarp back and forth across a transport box. In Fredin, a pull-belt winds and unwinds onto the shaft in opposite directions to the tarp and acts as a biasing means to rotate the shaft to roll and unroll the tarp. Petretti (U.S. Pat. No. 4,030,780) uses a motor or crank to turn a pivot rod located underneath a truck bed, and the pivot rod swings two arms that carry a roller rod. Two cables, oppositely wound around the roller rod, bias the roller rod to roll and unroll a canvas cover. Alternatively, Petretti discloses a pivot rod and swing arm system in which a motor rotates a stationary roller to reel in and out the canvas cover, and a spring system to move the arms back to the rear of the truck to extend the cover over the truck bed. Richard (U.S. Pat. No. 4,050,734) discloses piston-operated arms which swing a take-up roller that has a spring bias for rotation to roll up a flexible top cover. Tsukamoto (U.S. Pat. No. 4,673,208) discloses two swing arms pivoted by hydraulic pistons operating in master-slave relationship and a roller that is rotatably held by the two arms. The Tsukamoto system has a chain and sprocket system trained over a stationary track and trained up to a sprocket on the roller to rotate the roller to roll and unroll the cover sheet. The Tsukamoto system also has imperforate plates for closing up the gaps between the cover sheet and the truck bed walls.

DISCLOSURE OF INVENTION

This invention comprises a lever assembly that includes an arcuate member and an arm that extends out from the arcuate member to attach to one end of a rotatable roller and to hold the roller above a truck bed. An attachment means rotatably connects the lever assembly onto a side of the truck bed so that the arcuate member and arm lie in a plane parallel to the truck side. The invention further comprises a flexible connector and a drive means that extends into the plane of the lever assembly. The flexible connector has a first section that is attached to the arcuate member, extends in a first direction circumferentially around the outer arcuate edge of the arcuate member, and extends to the drive means. The flexible connector also has a second section that is attached to the arcuate member, extends circumferentially around the outer arcuate edge in a second direction, and extends to the drive means. The drive means cooperates with the flexible connector to pull the first section and let out the second section to rotate the lever assembly in the first direction, and to pull the second section and let out the first section to rotate the lever assembly in the second direction. The invention also comprises a flexible tarp attached at one end to the truck bed and attached at the other end to the roller, and a coiled spring inside the roller. The coiled spring biases the roller to rotate in a roll-up direction. The coiled spring is for keeping the tarp tightly rolled up when it is in the retracted position, for keeping the tarp taut when it is in the extended position, and for rotating the roller to roll up the tarp around the roller when the lever assembly swings to retract the tarp.

Optionally, the invention may include a mirror-image, second lever assembly, second flexible connector, and second drive means mounted on a second side of the truck to help support and move the roller and tarp. The arm of the second lever assembly rotatably connects to the second end of the roller. The mirror-image equipment may optionally include a second coiled spring.

This invention is a simple system that is easy to fabricate, operate, and maintain. Operation is smooth and consistent. Maintenance is easier because much of the invention's equipment may be placed along the sides of the truck and therefore is easy to reach. This invention keeps the tarp from flapping or unfurling in any of its various positions of extension or retraction.

BRIEF DESCRIPTION OF THE DRAWINGS

FIG. 2B is a front view of the embodiment of FIG. 1, with the tarp extended across the truck bed.

FIG. 5 is a cross-sectional side view of the roller with two coiled springs, viewed along the 5—5 line shown in FIG. 2B.

FIG. 6 is a view of the spring-arm securing means, as viewed along the 6—6 line shown in FIG. 5.

FIG. 7 is a view of the spring-roller securing-means, as viewed along the 7—7 line shown in FIG. 5.

BEST MODE FOR CARRYING OUT INVENTION

Figure 1:
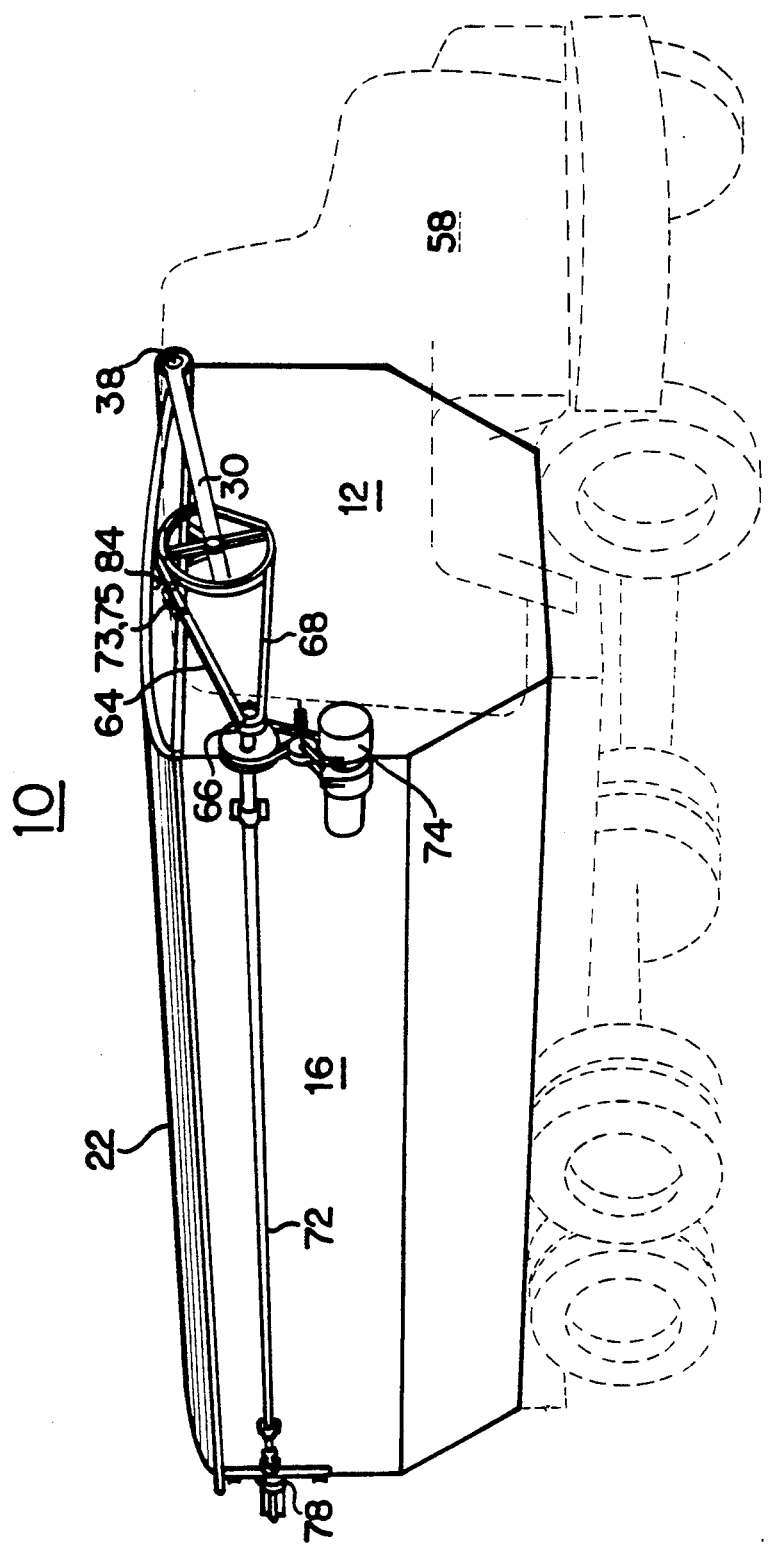
FIG. 1 is a perspective view of one embodiment of the invention.

Referring to FIGS. 1 through 7, there is shown the preferred, but not the only embodiment of the truck bed and cargo cover 10. The cover 10 is for use with a rectangular box or truck bed that has a first side 12, an opposing second side 14, a third side 16, and an opposing fourth side 18, with each side having a top edge 20. The cover 10 has a tarp 22 that is attached at an anchor end 24 to the third side 16 of the truck bed, and attached at the opposing roll-up end 26 to a roller 28. The roller 28 is held generally horizontally over the truck bed by a lever assembly 30 that is rotatably attached to the first side 12 of the truck bed, by an attachment means 32. In the preferred embodiment, a second lever assembly 34 is rotatably attached to the second side 14 of the truck bed by a second attachment means 36 to help support and move the roller 28. The first end 38 of the roller 28 is rotatably attached to the cantilevered end 40 of the arm 42 of the lever assembly 30, and the second end 44 of the roller 28 is rotatably attached to the cantilevered end 46 of the arm 48 of the second lever assembly 34.

The lever assembly 30 has an arcuate member 50, with an outer arcuate edge 52 and a center 54, and the arm 42. The arm 42 extends out past the outer arcuate edge 52 in substantially the same plane as the arcuate member 50. "Substantially the same plane" or "substantially coplanar" mean within a few inches of being in the same plane, so that the arm 42 and arcuate member 50 form a compact unit that may be placed between a side of the truck bed and the truck cab or on a side of the truck bed without sticking far out from the truck bed. The arcuate member 50 may be of various shapes, for example, a circular wheel or a semi-circular shape. The arm 42 may dissect the outer arcuate edge 52, or extend between the ends 55 of a semi-circular outer arcuate edge 52, as in the preferred embodiment shown in FIGS. 2A and 2B. The number of degrees that is defined by the portion of the outer arcuate edge 52 that is undissected by the arm 42 must be at least the number of degrees of the desired angle of rotation of the arm 42. For example, if the arm 42 needs to swing 180° in order to swing from the third side 16 to the fourth side 18, then the undissected portion of the outer arcuate edge 52 must be at least a half circle in circumferential length.

Figure 2A:
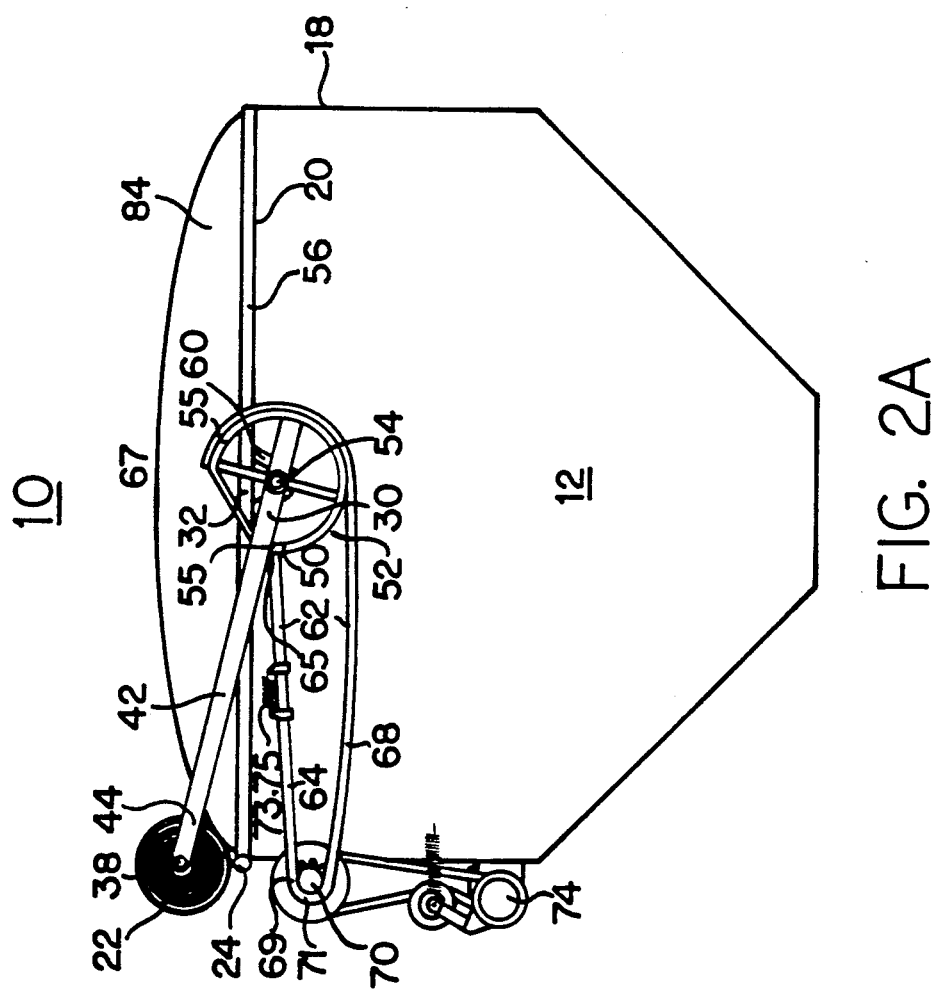
FIG. 2A is a front view of the embodiment of FIG. 1, with the tarp retracted.
Figure 3:
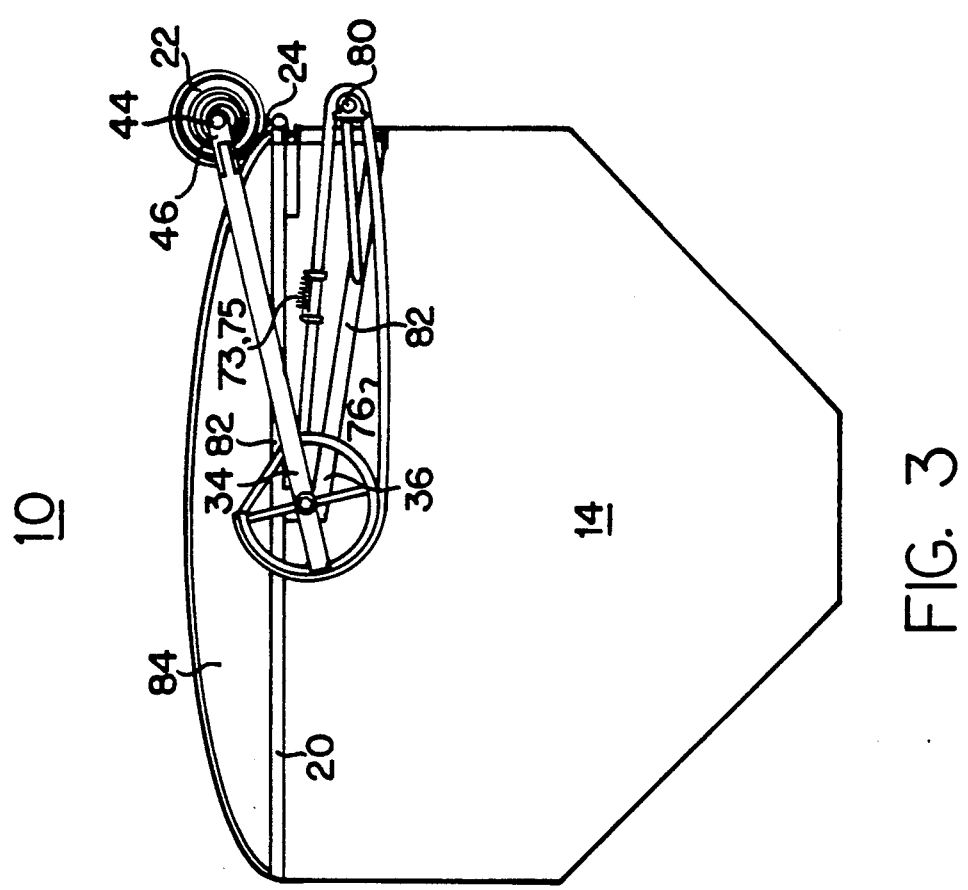
FIG. 3 is a rear view of the embodiment of FIG. 1, with the tarp retracted.
Figure 4:
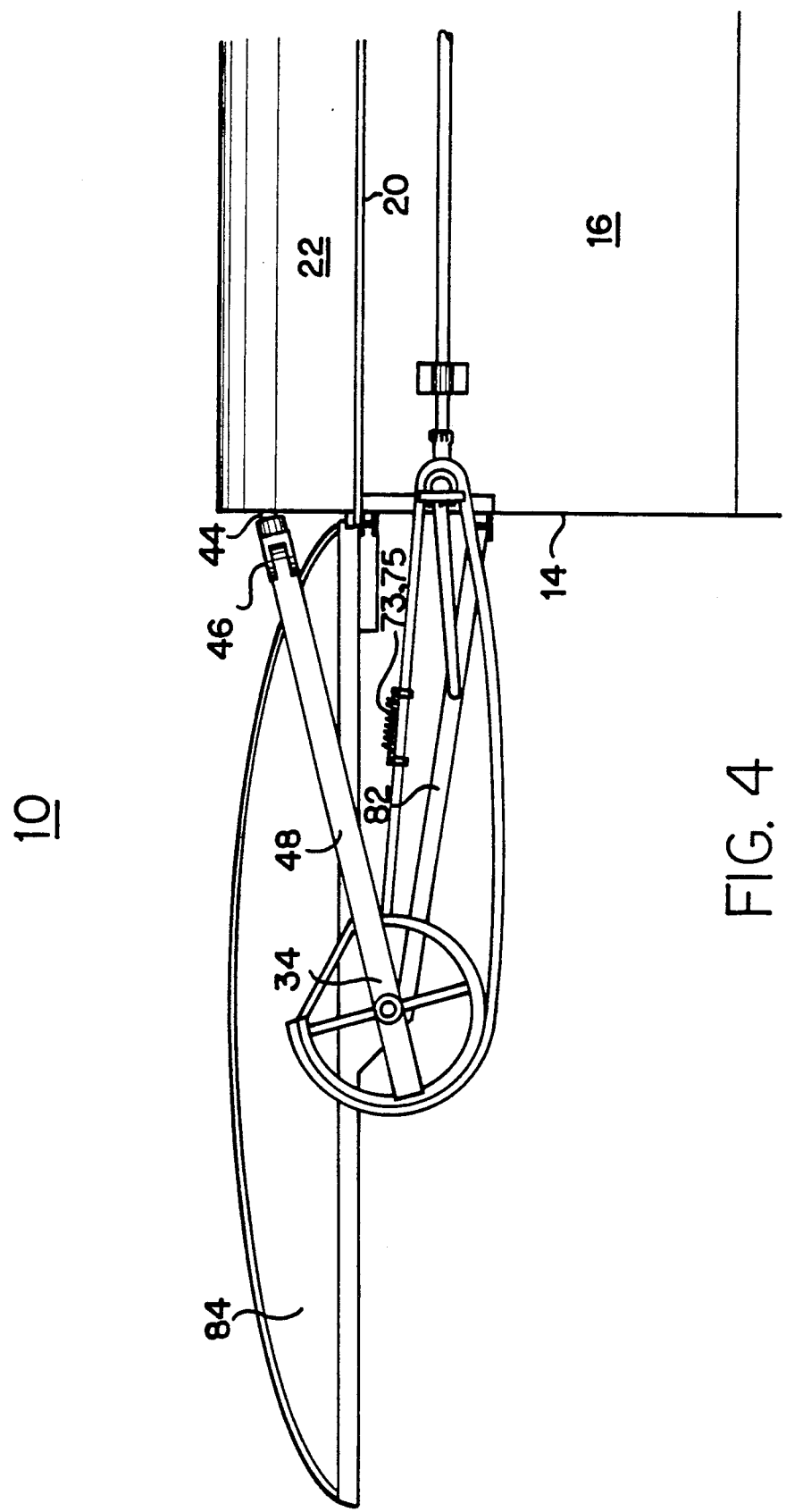
FIG. 4 is a partial left side view of the embodiment of FIG. 1, with the lever assembly swung away from the truck bed.

The arcuate member 50, and therefore the entire lever assembly 30, rotates around the center 54 bidirectionally, or, in other words, in a first direction, which in Figs. 2A and 2B is counter-clockwise, and in a second direction, which in FIGS. 2A and 2B is clockwise. In the preferred embodiment, the attachment means 32 comprises a bar 56 that is bolted or otherwise attached to the top edge 20 of the first side 12 of truck bed facing the truck cab 58, and a V-shaped extension 60 into which the arcuate member 50 is journaled or otherwise rotatably attached.

A flexible connector 62 has a first section 64 that is welded or otherwise attached at its anchor end 65 onto or near to the outer arcuate edge 52 and extends around the arcuate edge 52 in the first direction and reaches to a drive means 66. The flexible connector 62 also has a second section 68 that is welded or otherwise attached at its anchor end 67 onto or near to the outer arcuate edge 52 and extends around the arcuate edge 52 in the second direction to reach to the drive means 66. In the preferred embodiment, the first section 64 and second section 68 are joined at their pull ends 69 71 to form a chain that lies around a gear 70, which is the part of the drive means 66 that extends into the plane of the lever assembly 30. The gear 70 rotates on an axis shaft 72 that is rotated bidirectionally by a power mechanism 74. When the gear 70 rotates in the first direction, the first section 64 of chain is pulled and the second section 68 is let out, causing the arcuate member 50 and the entire lever assembly 30 to also rotate in the first direction and to swing the roller 28 toward the third side 16. Reversing the rotation of the gear 70 causes the first section 64 of the chain to be let out and the second section 68 to be pulled in, causing the arcuate member 50 and the entire lever assembly 30 to also rotate in the second direction and to swing the roller 28 toward the fourth side 18. When the first section 64 or second section 68 is being let out, that section lies down in partial circumferential contact with the outer arcuate edge 52.

Figure 8B:
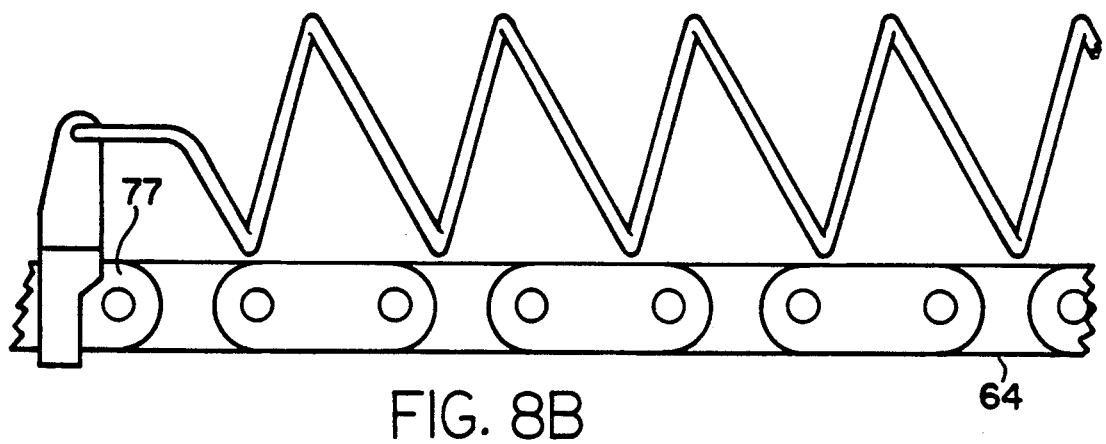
FIG. 8A and FIG. 8B show a detail of one embodiment of a tensioning means, shown taking in the slack in FIG. 8A and stretched out in FIG. 8B.
Figure 8A:
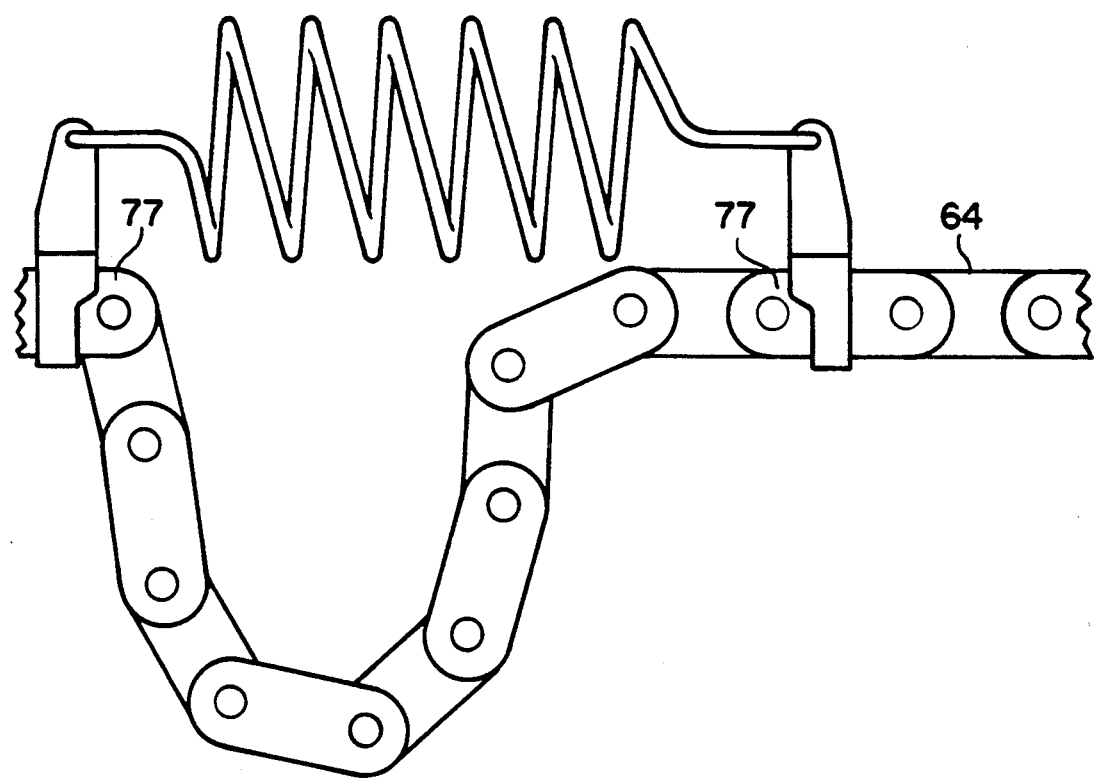

The chain formed from the first section 64 and second section 68 in the preferred embodiment also has a tensioning means 73 for taking up slack and keeping the chain tensioned. The tensioning means 73 helps keep the chain on track around the gear 70 and around the arcuate edge 52 and helps the cover 10 move smoothly and consistently. The preferred tensioning means is a spring 75, attached at both ends to the first section 64, which tends to pull together two portions 77 of the first section 64, as shown in FIG. 8A. When the tarp 22 is fully retracted or when the tarp 22 is fully extended over the truck bed, the spring 75 is stretched out and the first section 64 is pulled straight, as in FIG. 8B. While the second section 68 is being pulled to rotate the lever assembly 30 in the second direction and the roller 28 is midway over the truck bed, the spring 75 is collapsed and the two portions 77 are pulled together as in FIG. 8A.

Depending on the size of the roller 28, tarp 22, and area of cargo or truck bed to be covered, and on the strength and rigidity of the lever assembly 30 and roller 28 construction, the roller may be supported and swung by only the one lever assembly 30. In the preferred embodiment, however, the second lever assembly 34, a second flexible connector 76, and a second drive means 78 are located at the second side 14, or back end, of the truck bed. These second lever assembly 34, second flexible connector 76, and second drive means 78 are constructed, arranged, and operated in mirror image to the lever assembly 30, flexible connector 62, and drive means 66 that are on the first side 12. The second drive means 78 has a gear 80 that lies in the plane of the second lever assembly 34 and that is rotated by the axis shaft 72. The axis shaft 72 extends back from the first side 12 to connect drive means 66 with the second drive means 78 and to rotate them in synchronized speed and direction.

The second attachment means 36 may be a different design than the attachment means 32 on the first side 12. In the preferred embodiment, the second attachment means 36 is an angle iron brace 82 that attaches to the second side 14 and swings out on a hinge to move the second lever assembly 34 out of the way for operation of a truck bed door or for dumping cargo from the back of the truck. In this design, the cantilevered end 46 of the arm 48 of the second lever assembly 34 may be designed to be detached from the roller 28 or swing on a hinge when the second lever assembly 34 is swung away from the truck bed.

The preferred embodiment has two coiled springs 88 and 90, inside a hollow pocket 92 inside the roller 28. One coiled spring 88 is near the first end 38 of the roller 28 and is anchored at its outer end 94 to the cantilevered end 40 of the arm 42 by a spring-arm securing means 96. In the preferred embodiment, this spring-arm securing means 96 includes an outer plastic bearing 98 that secures the outer end 94 of the coiled spring 88 to a first shaft 100, which is attached to the cantilevered end 40 and on which the roller 28 rotates. The coiled spring 88 is anchored at its inner end 102 to the roller 28 by a spring-roller securing means 104. In the preferred embodiment, this spring-roller securing means 104 includes an inner plastic bearing 105 that secures the inner end 102 to the roller 28. The second coiled spring 90 is near the second end 44 of the roller 28 and is secured in mirror-image fashion by a second spring-arm securing means 106, which cooperates with a second shaft 108, and by a second spring-roller securing means 110.

The two coiled springs, 88 and 90, are wound in the same direction so that they both bias the roller 28 to rotate in a roll-up direction, which in FIGS. 2A and 2B is seen from the front of the truck as clockwise. The coiled spring 88 and 90 are of a strength, size, and design to accomplish three functions. First, the coiled springs 88 and 90 keep the tarp 22 tightly wound around the roller 28 when the tarp 22 is in a retracted position at the third side 16 so that the tarp 22 does not unfurl or flap when the wind blows or when the truck is driving down the road. Second, the coiled springs 88 and 90 allow the tarp 22 to unroll when the lever assemblies 30 and 34 rotate to extend the tarp 22 across the truck bed but keep tension on the tarp 22 to keep it taut against the truck bed or cargo. Third, the coiled springs 88 and 90 reroll the tarp 22 again around the roller 28 when the lever assemblies 30 and 34 swing to retract the tarp 22 to the third side 16. In the preferred embodiment, the coiled springs 88 and 90 are those that are used with a common overhead 10 automatic garage door. Optionally, one coiled spring 88 could be used instead of two, especially for a lighter weight, smaller tarp 22 and roller.

Optionally, imperforate plates 84 are part of the attachment means 32 and the second attachment means 36 and act as upward extensions of the first and second sides 12 and 14. These imperforate plates 84 encourage complete cover of the cargo when the cargo is heaped above the top edge 20. Optional drawstrings laced through the tarp 22 could further encourage a well-sealed cover for the cargo. Optional tie means could be used to secure the roller 28 or tarp 22 to the truck bed when the tarp 22 is in the retracted position or the extended position.

The tarp 22 may be any flexible sheet material, such as canvas or plastic, and preferably is water-resistant and tear-resistant. The power mechanism 74 may be of various designs, such as the electric motor shown in FIG. 1, or a manually-operated crank or wheel.

While there is shown and described the present preferred embodiment of the invention, it is to be distinctly understood that this invention is not limited thereto but may be variously embodied to practice within the scope of the following claims.

I claim:

1. A cover for use with a truck bed and a power mechanism, the truck bed having a first side and an opposing second side, and a third side and an opposing fourth side, with each side having a top edge, the cover comprising:
   a lever assembly including an arcuate member having an outer arcuate edge and a center, and an arm attached to and extending out in substantially coplanar relationship from the arcuate member, the arm having a cantilevered end extending out past the outer arcuate edge,
   an attachment means for rotatably attaching the lever assembly to the first side of the truck bed so that the lever assembly lies in, and rotates bidirectionally around the arcuate member center in a plane parallel to the first side of the truck bed, and so that the cantilevered end reaches above the top edge of the first side of the truck bed,
   an elongated roller having opposing first and second ends and a hollow pocket inside the roller, the first end being rotatably attached to the cantilevered end of the arm and the second for reaching toward the second side of the truck bed, so that the roller is positioned generally horizontally across and above the truck bed,
   a tarp for extension and retraction from over the truck bed, the tarp having an anchor end attached to the third side of the truck bed and an opposing roll-up end attached to the roller,
   a flexible connector comprising
      a first section being attached at an anchor end to the arcuate member, extending in a first direction to removably and circumferentially contact the outer arcuate edge, and having a pull end, and
      a second section being attached at an anchor end to the arcuate member, extending in a second direction to removably and circumferentially contact the outer arcuate edge, and having a pull end,
   a drive means for cooperating with and being energized by the power mechanism, the drive means extending into the plane of the lever assembly and contacting the pull ends of the flexible connector first and second sections for pulling the first section and letting out the second section to rotate the arcuate member in the first direction and for pulling the second section and letting out the first section to rotate the arcuate member in the second direction, for bidirectionally swinging the cantilevered end of the arm above the top edge of the truck bed first side and the roller above the truck bed,
   a coiled spring located inside the hollow pocket of the roller for biasing the roller to rotate in a roll-up direction, for keeping the tarp taut when extended across the truck bed, for rolling up the tarp around the roller when the lever assembly swings to retract the tarp, and for keeping the tarp tightly rolled when in the retracted position,
   a spring-arm securing means for securing the outer end of the coiled spring to the cantilevered end of the arm, and
   a spring-roller securing means for securing the inner end of the coiled spring to the roller.

2. A cover as set forth in claim 1, wherein the drive means comprises:
   a gear lying in the plane of the lever assembly, and
   an axis shaft rigidly attached to the gear, the axis shaft for being bidirectionally rotated by the power mechanism, and
wherein the pull ends of the flexible connector first and second sections are joined together and trained in circumferential contact around the gear, and wherein the flexible connector further comprises a tensioning means.

3. A cover as set forth in claim 1, further comprising a second lever assembly, a second flexible connector, and a second drive means, all of mirror image construction and arrangement relative to the lever assembly, flexible connector, and drive means located at the first side of the truck bed, and the cover further comprising a second attachment means for rotatably attaching the second lever assembly to the second side of the truck bed, and wherein the second end of the roller is rotatably attached to the cantilevered end of the arm of the second lever assembly, and the second drive means cooperates with the power mechanism for bidirectionally rotating the second lever assembly.

4. A cover as set forth in claim 3, wherein the drive means and second drive means comprise:
  a gear lying in the plane of the lever assembly,
  a second gear lying in the plane of the second lever assembly, and
  an axis shaft rigidly connecting the said gear and second gear, for being bidirectionally rotated by the power mechanism to synchronously and bidirectionally rotate the said gear and second gear, and
  wherein the pull ends of the flexible connector are joined together and trained in circumferential contact around the gear and wherein the pull ends of the second flexible connector are joined and trained in circumferential contact around the second gear, and
  wherein the flexible connector and second flexible connector each further comprise a tensioning means.

5. A cover as set forth in claim 3, further comprising:
  a second coiled spring located in the hollow pocket inside the roller, for biasing the roller to rotate in the said roll-up direction,
  a second spring-arm securing means for securing the outer end of the second coiled spring to the cantilevered end of the arm of the second lever assembly, and
  a second spring-roller securing means for securing the inner end of the second coiled spring to the roller.

* * * * *